United States Patent [19]

Lowry et al.

[11] 4,107,736
[45] Aug. 15, 1978

[54] NOISE REDUCTION SYSTEM FOR VIDEO SIGNALS

[75] Inventors: John D. Lowry, Willowdale, Canada; Kenneth F. Holland, Granada Hills, Calif.

[73] Assignee: Image Transform, Inc., Los Angeles, Calif.

[21] Appl. No.: 209,910

[22] Filed: Dec. 20, 1971

[51] Int. Cl.$^2$ ............................................. H04N 5/14
[52] U.S. Cl. ................................... 358/36; 358/12; 358/37; 358/105; 358/166; 358/167
[58] Field of Search ....... 178/5.2 R, 5.2 CD, DIG. 3; 358/12, 36, 37, 105, 166, 167, 133, 135, 136, 31, 8

[56] References Cited

U.S. PATENT DOCUMENTS

| | | | |
|---|---|---|---|
| 2,841,645 | 1/1958 | Stateman | 358/167 |
| 2,906,816 | 9/1959 | Kretzmer | 358/133 |
| 3,184,542 | 5/1965 | Horsley | 358/136 |
| 3,265,810 | 8/1966 | Falk | 358/31 |
| 3,594,498 | 7/1971 | Smith | 358/8 |
| 3,674,920 | 7/1972 | Faroudja | 358/31 |

FOREIGN PATENT DOCUMENTS 1,287,114  1/1969  Fed. Rep. of Germany.

Primary Examiner—Howard W. Britton
Attorney, Agent, or Firm—Phillips, Moore, Weissenberger, Lempio & Majestic

[57] ABSTRACT

Noise in a video picture is sharply reduced using the redundancy of information present in those portions of the picture which remain unchanged through several successive frames. A number of successive frames are compared to determine which portions of the picture are in motion and which are stationary. The moving portions of the image are separated from the stationary portions and are processed in a conventional manner. The stationary portions, however, are combined on a frame-by-frame basis to produce a highly noise-free averaged signal. In color systems, the conventional luminance-chroma separation methods used for the moving portions of the picture are replaced, in the stationary portions, by an opposite-phase frame comparison method which provides 100% separation regardless of the nature of the image.

17 Claims, 6 Drawing Figures

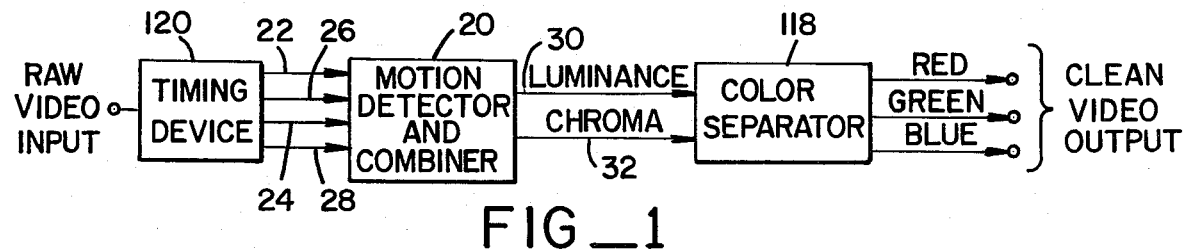
FIG_1
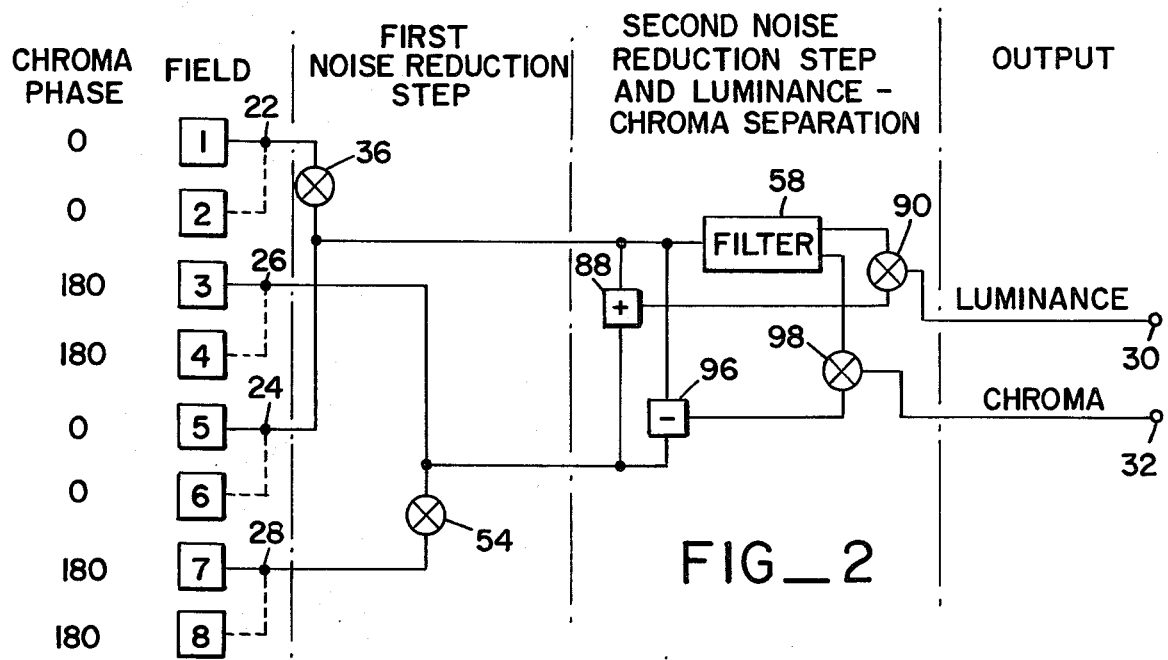
FIG_2
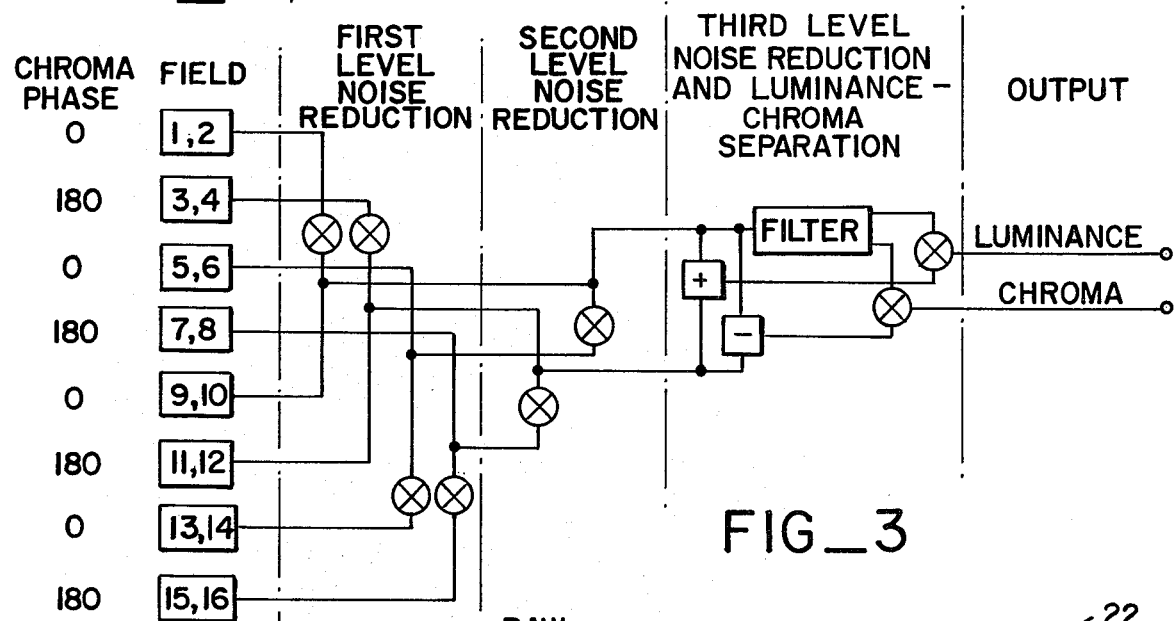
FIG_3
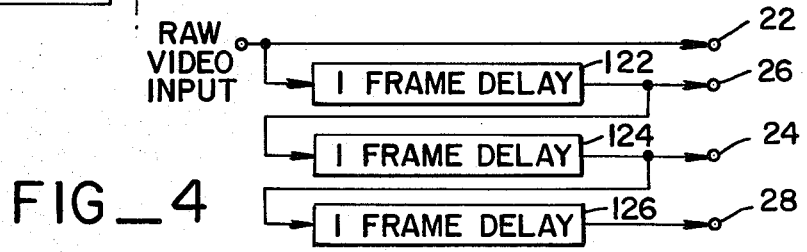
FIG_4

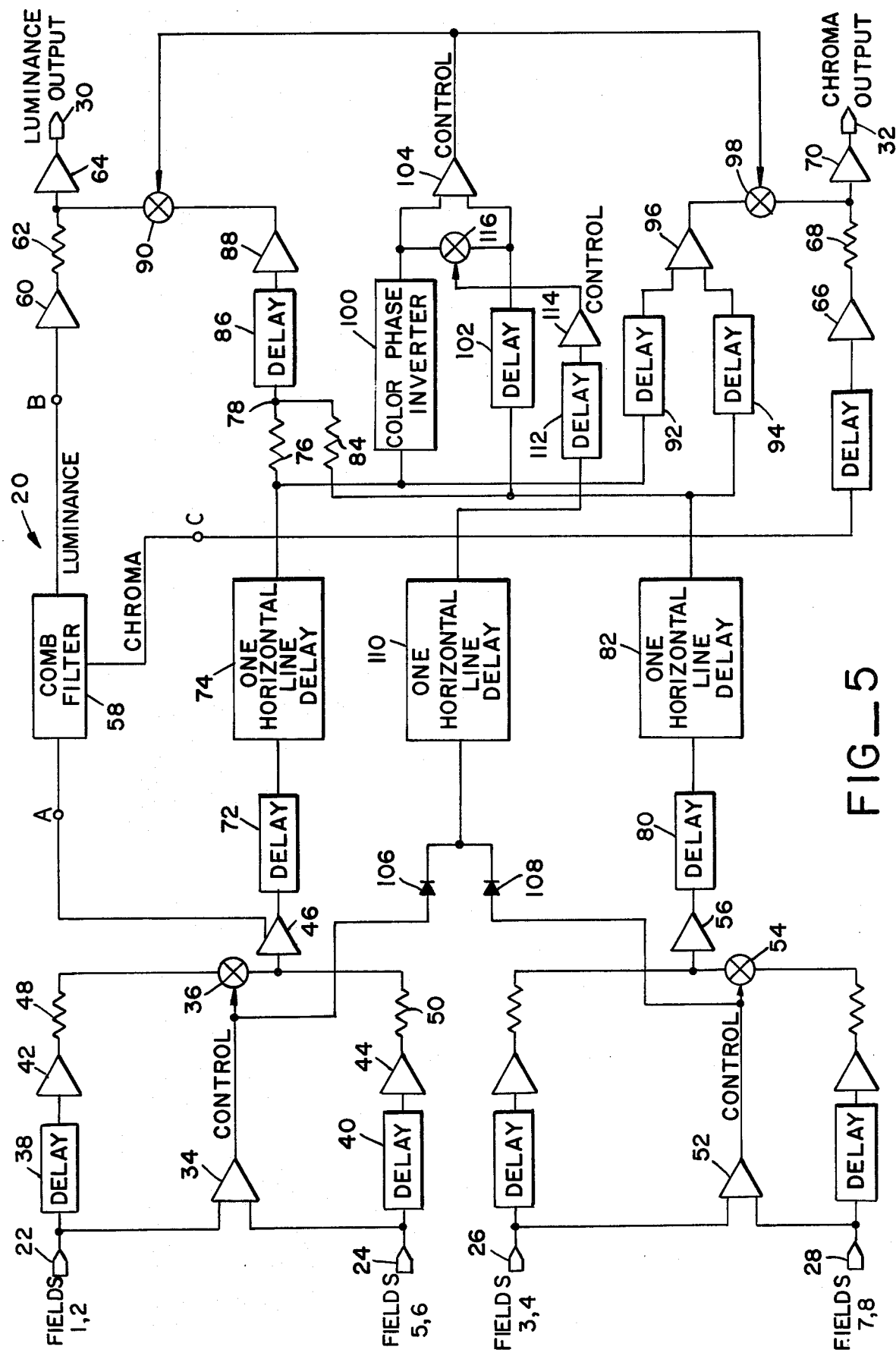
FIG_5

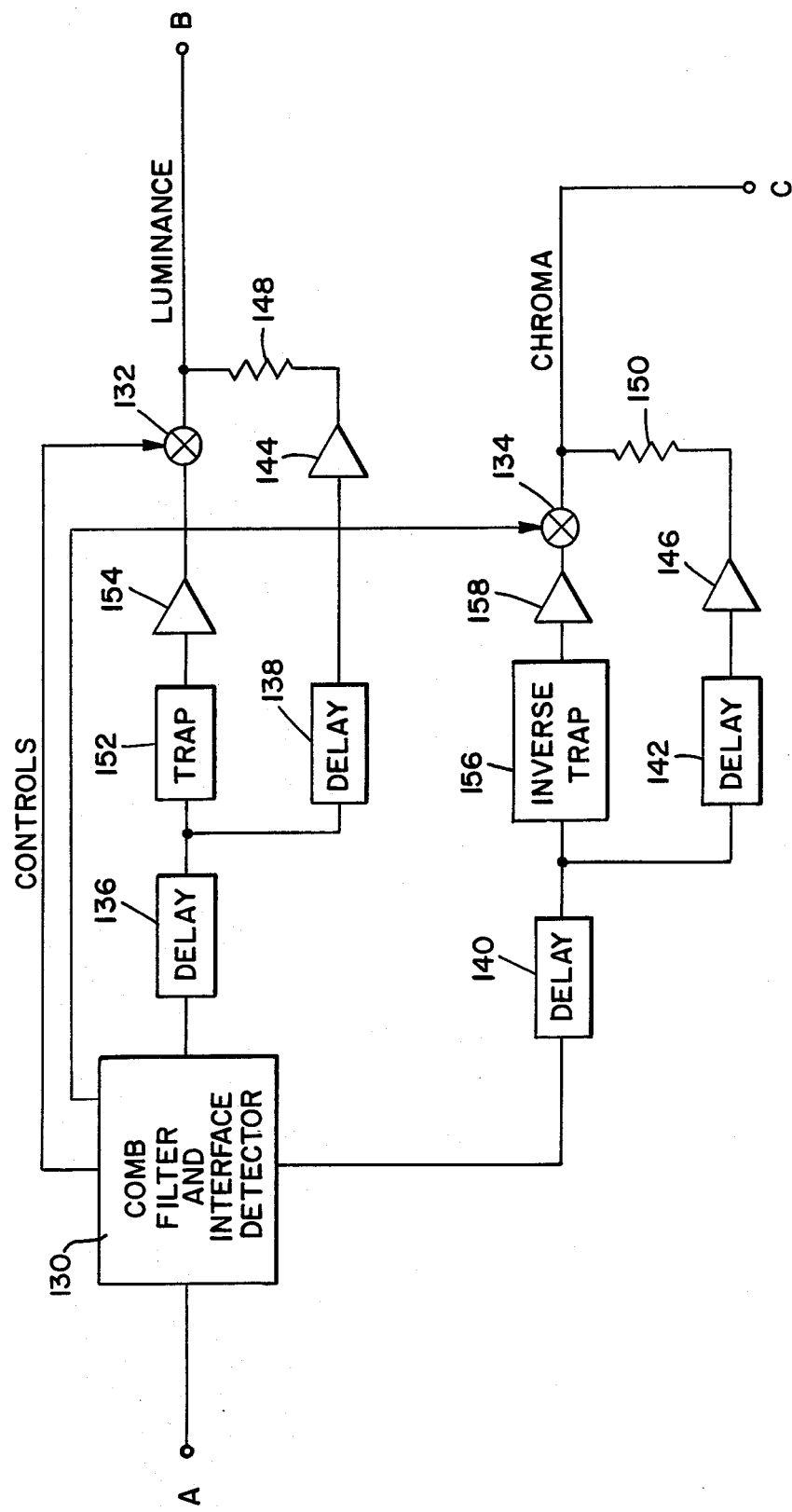
FIG_6

NOISE REDUCTION SYSTEM FOR VIDEO SIGNALS

BACKGROUND OF THE INVENTION

Although noise creates a problem in any video system, the normal picture quality of commercial television sets is so low that the viewer generally tolerates a fair amount of noise and signal distortion. In the large-screen television art, the videotape-to-film or electronic film-to-film conversion art, and the astronautical communications art, the noise problem assumes major proportions, particularly where color signals are involved. Noise in this discussion encompasses all kinds of random signal degradation. In film-to-film conversion, it may be caused by the grain structure of the original film; in any system, it may be caused by supurious electronic signals; and in color video systems, it may be caused by incomplete separation of the luminance and chroma signals.

It has previously been proposed to reduce noise in video systems by comparing information from adjacent portions of a video image, an e.g., by comparing successive lines of the same image. Due to the variation of image information from line to line, the applicability of this technique is severely limited, quite aside from the fact that it degrades the sharpness of the picture.

In color television, the standard video signal contains a luminance information component in the form of wide-band amplitude modulation of the video carrier, and a chroma information component in the form of modulation of a color subcarrier whose phase alternates between 0° and 180° between successive lines of a field and between corresponding lines of corresponding fields of successive frames of the picture. For color decoding purposes, these two components must be separated and individually processed by appropriate circuits.

The simplest way of separating the luminance and chroma components is to filter out the color subcarrier and its sidebands. This approach, however, removes valuable high-frequency information from the luminance component and produces spurious chroma information due to high-frequency luminance modulation. In the prior art, these disadvantages have been eliminated by using a so-called comb filter which compares two successive lines of the image (whose chroma components, as stated above, are of opposite phase) and produces a pure luminance component by addition and a pure chroma component by subtraction. The disadvantage of the comb filter is that wherever there is a substantial color or intensity change in the image from one line to the next, edge sharpness is lost and color or intensity distortion occurs due to incomplete separation.

SUMMARY OF THE INVENTION

The system and method of this invention achieves its objectives by using the redundancy present in the stationary portions of a sequence of frames. This is done by comparing and averaging the corresponding elements of a group of closely time-related image fields. Inasmuch as a comparison between such widely time-separated information would severly distort any motion in the image, such motion is detected and the comparison is made only on the stationary parts of the image. In the moving parts, no attempt is made to reduce noise or to improve luminance-chroma separation, but the naturally blurry appearance of an object in motion makes noise reduction or high-quality separation unnecessary in the moving area of the image.

In accordance with the invention, 100% luminance-chroma separation is achieved without picture degradation in the stationary portions of the image (i.e., the only portions where picture quality is important) by comparing not adjacent lines of the same field, but corresponding lines of corresponding fields of adjacent or nearly adjacent frames. In the moving portions of the image, where adjacent frames are not comparable, but where, on the other hand, picture quality is not so important, the system of the invention falls back on conventional separation means such as a comb filter, which is good enough for those portions.

The separation of the stationary image information from the moving image information and its separate processing makes commercially practical the simultaneous comparison of as much a eight fields, resulting in a noise reduction of almost 90%, i.e., nearly 10 db. Even a four-field comparison system still achieves a 75% noise reduction, which is usually adequate for even the super-high quality requirements of most large-screen television systems or videotape-to-film conversion systems.

It is the primary object of this invention to utilize the inherent redundancy of information in the stationary portions of a sequence of video image frames to improve the visual quality of the picture.

It is another object of the invention to provide a video noise reduction system using a process which compares alternate image fields.

It is a further object of the invention to provide a video noise reduction system in which a comparison is made only between substantially stationary portions of the image fields, with the moving portions of the image being processed by conventional means.

It is yet another object of this invention to provide a color video noise reduction system in which luminance-chroma separation is done by algebraic processing of corresponding opposite-phase information from two different fields in the substantially stationary portions of the image, and by other means in the moving portions of the image.

BRIEF DESCRIPTION OF THE DRAWINGS

FIG. 1 is a schematic block diagram of the basic environment in which the picture quality improvement system of this invention is used;

FIG. 2 is a schematic representation of a two-level combining pattern suitable for the improvement of color video images;

FIG. 3 is a schematic representation similar to FIG. 2 but showing a three-level pattern;

FIG. 4 is a block diagram of a possible simple type of timing device which can be used with the device of this invention;

FIG. 5 is a circuit diagram, partly in block form, of a circuit carrying out the principles of the invention; and FIG. 6 is a partial block diagram of an alternative embodiment of the invention.

DESCRIPTION OF THE PREFERRED EMBODIMENT

The invention is based on the recognition that if any moving picture is divided into a large number of incremental areas or elements, it is statistically almost a certainty that a majority of these areas will be "stationary", i.e., exhibit no significant change in luminance (and hue, in a color picture) from one frame to the next. The repetition of stationary areas in successive frames of a moving picture is redundant, i.e., it conveys no information not already available.

This redundancy has previously been utilized in audiovisual telephony to reduce the bandwidth of video signals for transmission over conventional telephone cables. In the present invention, however, it is used in the opposite sense to improve the visual quality of a video picture by substantially eliminating noise and luminance-chroma interference from the stationary portions of the picture.

Referring first to FIG. 5, that figure shows in detail a preferred embodiment of the apparatus carrying out the basic concept of this invention. This apparatus is generally designated by the reference numeral 20 in FIGS. 1 and 5. With the two-level combination pattern of FIG. 2, the device 20 has four inputs denoted 22, 24, 26, and 28. These inputs alternately receive fields 1, 5, 3, and 7, respectively, and 2, 6, 4, and 8, respectively, of the comparison field group shown in FIG. 2. The output of the device 20 appears at terminals 30, 32 and alternately represents the luminance and chroma components, respectively, of the odd-field combination, and the luminance and chroma components, respectively, of the even-field combination. It will be understood that an odd field and an even field together make up a frame of the moving picture.

In FIG. 5, the inputs 22, 24 are connected to a motion detector 34. The motion detector 34 is a conventional comparator circuit and is designed to produce, at any given instant, an output proportional to the absolute value of the difference between the signals appearing at inputs 22 and 24 at that instant. The output of motion detector 34 is the control signal which controls the gate 36.

The gate 36 may be a conventional transistorized gating circuit whose resistance gradually increases from a closed-circuit condition to an open-circuit condition as its control signal increases from a level representing about a 2% difference between the input signals at 22, 24 to a level representing about a 20% difference between the input signals at 22, 24.

The input signals 22, 24 are also fed through delay lines 38, 40, respectively, to DC clamping amplifiers 42, 44, respectively. The clamping amplifiers provide a constant, equal DC reference level on each side of the gate 36, so that the signal level at the high-impedance input to amplifier 46 will remain constant regardless of the condition of gate 36. The load resistors 48, 50 being equal, the AC input to amplifier 46 is composed of one half of signal 24 and one half of signal 22 when gate 36 is in the closed-circuit condition, and of the whole signal 24 alone when gate 36 is in the open-circuit condition, with a gradual transition between these extremes.

The purpose of delay lines 38, 40, which may be of about 80 ns each, is to allow the control signal to operate the gate 36 in synchronism with the appearance across it of the signals which caused it to operate.

It will be understood that in the same manner as described above, signals 26 and 28 are compared by motion detector 52, with signal 28 being gated by gate 54, and the combination of signals 26 and 28 being fed to amplifier 56. The outputs of amplifiers 46 and 56, whose stationary portions are a combination of two fields each, represent a noise reduction, in the stationary portions of the picture, of 50%.

In the second processing level, the output of amplifier 46 is fed through a conventional comb filter 58 which compares adjacent lines of the scan (in which the phase of the chroma component of the signal is reversed) and separates the chroma component from the luminance component. The disadvantage of the comb filter 58 is that by comparing successive lines, it malfunctions whenever the information in two adjacent lines is materially different. Because the comparison is made between different portions of the same image, the comb filter 58 is not affected by motion.

The luminance output of the comb filter 58 is fed through a DC clamping amplifier 60 and a resistor 62 to the high-impedance input of luminance output amplifier 64. The output of the amplifier 64 constitutes the luminance signal output 30 of the device 20. In the same manner, the chroma output of comb filter 58 is processed through clamping amplifier 66, resistor 68, and chrom output amplifier 70 to the chroma output terminal 32 of device 20.

The output of amplifier 46 is also fed through a 500 ns delay line 72, 63.5 μs delay line 74, and resistor 76 to junction 78. The 63.5 μs delay represents a delay of one horizontal line and compensates for the fact that the output of comb filter 58, which works by comparing each line with the next succeeding line of its field, of necessity trails its input by one horizontal line interval. In the same manner, the output of amplifier 56 is fed through 500 ns delay line 80, 63.5 μs delay line 82, and resistor 84 to juntion 78. Delay lines 74 and 82 are thus unnecessary if non-comparative luminance-chroma separation means are used instead of the comb filter 58.

Because resistors 76 and 84 are equal, the signal appearing at junction 78 is composed of one half the output of amplifier 46 plus one half the output of amplifier 56. It will be noted from FIG. 2 that the output of amplifier 46, being a comparison of fields 1 and 5, has a chroma phase of 0°. By contrast, the output of amplifier 56, being a comparison of fields 3 and 7, has a chroma phase of 180°. Consequently, in the stationary portions of the image, the chroma components of the signals fed to junction 78 cancel each other out, and the composite signal appearing at junction 78 is a pure luminance signal. Inasmuch as the input signal combination at amplifiers 46 and 56 each reduced noise by one half, the signal combination at point 78 reduces noise by one half again, for a total noise reduction in the luminance signal at point 78 of 75%.

The composite signal appearing at point 78 is fed through a further 160 ns delay line 86 to the input of DC clamping amplifier 88 to one side of the gate 90, whose other side is connected to the input of luminance output amplifier 64. The combination of the 500 ns delay 72 and the 160 ns delay 86 compensate for the inherent delay of the electronic components used in the luminance channel of comb filter 58.

The outputs of amplifiers 46 and 56, after being delayed by delay lines 72, 74, and 80, 82, respectively, are also supplied through further 150 ns delay lines 92, 94, respectively, to the inputs of an operational amplifier 96 which algebraically subtracts the signal coming from amplifier 56 from the signal coming from amplifier 46, and applies a DC clamping potential to the resulting difference signal. Inasmuch as the chroma components of the two delayed signals are 180° out of phase, but the luminance components are not, the output of the operational amplifier 96 in the stationary portions of the image is a pure chroma signal with a 75% noise reduction. The output of operational amplifier 96 is connected to one side of gate 98, whose other side is connected to the input of chroma output amplifier 70.

The signal coming from the output of delay line 74 is also fed to a color phase inverter 100. By contrast, the signal coming from the output of delay line 82 is merely delayed an additional 100 ns by delay line 102. The purpose of delay line 102 is to compensate for the inherent delay in the internal circuitry of inverter 100. Color phase inverter 100 is arranged to invert the phase of any signal components lying in the color subcarrier frequency band, leaving the remainder of the signal unchanged. The internal circuitry of inverter 100 is conventional.

Inasmuch as the chroma components of the signals from amplifiers 46 and 56 are 180° out of phase, the inputs to the motion detector 104 are substantially equal in the stationary parts of the image. If there is any difference (e.g., in the moving portions of the image) between the signal coming from color phase inverter 100 and that coming from delay line 102, motion detector 104 produces a control signal which switches gates 90 and 98 from their normal closed-circuit condition to their open-circuit condition. Gates 90 and 98, unlike mixing gates 36 and 54 which are connected to produce a gradual transition from a 0-100% mix to a 50-50% mix of inputs, are selector gates which convey either the compared signal or the comb filter output signal to the output amplifiers, also with a gradual transition from one to the other.

In practice, it is impossible to build the color phase inverter 100 in such a manner as to produce a perfect phase inversion at the chroma carrier frequency and not to have any phase-shifting effect at any other frequency. As a result, luminance transients tend to be increasingly distorted by the inverter 100 as they approach the color subcarrier frequency range. Consequently, luminance transients in or near that frequency range tend to produce false motion indications in the motion detector 104.

To prevent the erroneous actuation of gates 90, 98, and the consequent unnecessary loss of valid picture quality information, the control signals produced by motion detectors 34 and 52 may be applied through isolation diodes 106, 108, 63.5 μs delay line 110 (necessary only if a comparative separator such as comb filter 58 is used), 420 ns delay line 112, and DC clamping amplifier 114 to the control electrode of gate 116. The gate 116 is an inverter gate, i.e., it is arranged to short out the inputs to motion detector 104 whenever the control signal from clamping amplifier 114 is absent. Therefore, whenever motion detector 34 finds no motion between fields 1 and 5, and motion detector 52 finds no motion between fields 3 and 7, there is not likely to be any motion between fields 3 and 5, and motion detector 104 can therefore safely be disabled.

As has been inferred by the above description, the purpose of all delay lines shown herein is to provide proper time coincidence of corresponding signals at their junction and comparison points, and to operate the gates in precise coincidence with the appearance at the gates of the signals to be gated. It will therefore be understood that the amounts of these delays may vary, depending on the particular circuitry used, without departing from the teaching of the invention.

The inputs of device 20 at terminals 30, 32 provide, for use in an appropriate color decoding device 118 (FIG. 1), the luminance and chroma components, respectively, of field 5 (during the odd-field scan) or 6 (during the even-field scan), with 75% of all noise removed from the fully stationary areas of the image, i.e., those portions of the image in which no significant luminance or chroma change takes place during the time interval between fields 1 and 7 (or 2 and 8, as the case may be). In addition, the device 20 provides a 50% noise reduction if motion occurs only between fields 5 and 7 (6 and 8 during the even-field scan), because in that condition, although gates 90 and 98 are operated, gate 36 is not, and the comb filter 58 is supplied with a combination of fields 1 and 5.

Inasmuch as the information from fields 5 and 6 always appears at the outputs, regardless of motion, fields 5 and 6 are known as the prime fields, and together constitute the prime frame. In the use of the device 20, the successive fields of a video motion picture must be presented to the input of device 20 repetitively, e.g., a given field of the video motion picture may be scanned as field 1 at a first point of time, then re-scanned as field 3, re-scanned again as field 5, and finally re-scanned a fourth time as field 7. During each scan, other fields of the video motion picture are presented to the other inputs of device 20. Only when the given field is scanned as field 5, however, do all of its parts appear at the outputs of device 20; in any other scan, only its stationary parts are used.

The manner in which this repetitive scanning is accomplished may vary depending on the environment in which the invention is used. In its simplest form shown in FIG. 4, the timing device 120 of FIG. 1, which produces the repetitive scan, may consist simply of three delay lines 122, 124, and 126, each of which delays the raw video signal by one frame (i.e., two fields). More sophisticated timing devices may be used for various purposes, one such device being described in the copending application Ser. No. 209,859, filed Dec. 20, 1971, and entitled "VIDEO-TO-FILM CONVERSION PROCESS".

The invention is not limited to the comparison of four frames as described hereinabove. Even better noise reduction (87-½%) can be achieved with a three-level comparison system using eight frames. The comparison pattern of such a system is schematically illustrated in FIG. 4, and it will be seen that fields 9 and 10 are the prime odd and even fields, respectively, in that system. Beyond eight frames, however, comparison tends to become impractical for several reasons. One such reason is the increased complexity of the equipment and the reduction in the image area which is stationary over the entire comparison time. These factors offset any further gain in noise reduction in all but a few high-noise, low-motion applications such as those found in astronautical communications. Another reason, present in all systems, is that just before and just after an object in the image is in motion, noise appears in it because the noise-reducing comparison stops several frames before the motion begins, and does not resume until several frames after the motion ends. If this noisy period, particularly before the motion, exceeds a very few frames in length, it becomes quite noticeable and annoying to the viewer.

The comparison patterns themselves may vary for monochromatic images, but where color is involved, they must take into account the chroma phase alternation between frames.

FIG. 6 shows an alternative embodiment of the invention, in which better luminance-chroma separation is achieved along horizontal interfaces in the image. The circuitry of FIG. 6 replaces the circuitry between points A, B, and C in FIG. 5.

In FIG. 6, the comb filter 130 is of the same type as comb filter 58 in FIG. 5, but filter 130 further contains an interface detector circuit (similar to circuit 34 of FIG. 5) connected to detect dissimilarities between the two lines which comb filter adds and subtracts to produce its luminance and chroma outputs.

The interface detector portion of filter 130 produces a control signal which is applied to selector gates 132, 134. If the lines being compared are identical, gates 132, 134 are blocked, and the comb filter signals are conveyed directly to outputs B and C through delay lines 136, 138 and 140, 142, respectively, DC clamping amplifiers 144 and 146, respectively, and resistors 148 and 150, respectively.

If, however, the interface detector detects a disparity between the lines being compared (as would be the case along s horizontal interface), control signals are produced to unblock the gates 132, 134. In the luminance channel, this causes the signal from comb filter 130 to be routed through delay line 136, trap 152, and DC clamping amplifier 154 to output B. The trap 152 is a conventional band-pass filter which filters out all signal components lying in the color subcarrier frequency band.

In the chroma channel, actuation of gate 134 causes the signal from comb filter 130 to be routed through delay line 140, inverse trap 156, and DC clamping amplifier 158 to output C. The inverse trap 156, like trap 152, is a conventional band-pass filter, but inverse trap 156 is connected to pass only signal components lying in the color subcarrier frequency band.

Delay lines 136, 140 provide a one-picture-element delay of about 100 ns for effective gate operation, while delay lines 138 and 142 compensate for the internal delays of traps 152 and 156, respectively.

Due to the quality characteristics of the chroma signal, the chroma channel circuitry of FIG. 6 may optionally be omitted and the chroma signal conveyed directly from comb filter 130 to point C.

What is claimed is:

1. A method for improving the quality of a video picture, comprising the steps of:
   (a) electronically comparing corresponding portions of at least two successive frames of the video signal;
   (b) deriving from each said comparison a combination signal representing an average of the corresponding signals from each of the frames being compared; and
   (c) transmitting each of said combination signals.

2. A method for improving the quality of a video picture, comprising the steps of:
   (a) electronically comparing corresponding portions of at least two separate frames of the video signal;
   (b) detecting those portions in which the comparison indicates the presence of motion in the image between frames;
   (c) transmitting, during those portions of the image scan where motion is present, a signal representative of only one selected one of said frames being compared; and
   (d) transmitting, during those portions of the image scan where motion is absent, a signal representative of a combination, in predetermined proportions of at least two of said frames being compared.

3. The method of claim 2, wherein said electronic comparison of corresponding frame portions is performed on pairs of individual frames separated in time from one another.

4. A method of improving the quality of a color video picture, comprising the steps of:
   (a) electronically comparing corresponding portions of at least two successive frames of the video signal; and
   (b) algebraically combining the corresponding signals from at least two frames having chroma components of opposite phase to provide separate luminance and chroma signals each representative of a combination of the luminance and chroma components of at least two of said frames being compared.

5. A method for improving the quality of a color video picture, comprising the steps of:
   (a) electronically comparing corresponding portions of at least two separate frames of the video signal;
   (b) detecting those portions in which the comparison indicates the presence of motion in the image between frames; and
   (c) algebraically combining, only in those portions of the image scan where motion is absent, the corresponding signals from at least two frames having chroma components of opposite phase to provide separate luminance and chroma signals each representative of a combination of the luminance and chroma components of at least two of said frames being compared.

6. Apparatus for reducing noise in video pictures, comprising:
   (a) input means for simultaneously receiving input signals representative of corresponding portions of a plurality of frames of the raw video signal;
   (b) combining means connected to combine at least two of said input signals in predetermined proportions to produce a combination signal;
   (c) motion detection means arranged to receive at least two of said input and combination signals, and to produce at least one control signal upon detection of a difference between at least two of said received signals;
   (d) output means; and
   (e) gating means controlled by said control signals to convey to said output, in response to said control signals, either a predetermined one of said input signals or a combination signal.

7. Apparatus according to claim 6, in which at least one of said gating means is a progressive mixing gate.

8. Apparatus according to claim 6, in which said input means are arranged to receive input signals representative of corresponding portions of pairs of individual frames separated from one another in time.

9. Apparatus for reducing noise in video picture comprising:
   (a) input means for simultaneously receiving input signals representative of corresponding portions of a plurality of frames of the raw video signal;
   (b) combining means connected to combine at least two of said input signals to produce a combination signal;
   (c) motion detection means arranged to receive at least two of said input and combination signals, and to produce at least one control signal upon detection of a difference between at least two of said received signals;
   (d) output means;

(e) gating means controlled by said control signals to convey to said output, in response to said control signals, either a predetermined one of said input signals or a combination signal; and (f) means for eliminating luminance-chroma interference noise in color video pictures, said means including:

(i) algebraic processing means arranged to receive two of said input and combination signals having chroma components of opposite phase, and to produce separate luminance and chroma signals by addition and subtraction of said two received signals; and (ii) alternate luminance-chroma separation means capable of producing separate luminance and chroma signals on the basis of information containable in a single frame of the video signal;

(iii) said gating means including selection means responsive to said control signals for selectively applying to said output means the luminance and chroma signals of said algebraic processing means, and the luminance and chroma signals of said alternate separation means.

10. Apparatus according to claim 9, in which said alternate separation means is a comb filter.

11. Apparatus according to claim 9, in which said alternate means comprise:

(a) additional gating means;

(b) comb filter means including means for actuating said additional gating means upon occurrence of a disparity between the image lines being operated upon by said comb filter means to produce its filtering action; and (c) band-pass filtering means arranged to separate luminance-frequency signal components from color subcarrier-frequency signal components;

(d) said additional gating means being connected to pass the output of said comb filter means through said band-pass filtering means only when said additional gating means are actuated.

12. Apparatus according to claim 9, further comprising:

(a) color phase inverter means connected to receive one of said two signals received by said algebraic processing means and to reverse the phase of those signal components which lie in the frequency band of the color subcarrier; and (b) comparator means arranged to receive said color phase inverted signal and the other of said two signals received by said algebraic processing means, and to produce a control signal whenever a difference exists between said signals received by said comparator means;

(c) said gating means being controlled at least in part by said last-named control signal.

13. Apparatus according to claim 12, further comprising disabling means arranged to disable said comparator means in response to the absence of any control signals produced by said motion detector means.

14. Means for separating the luminance component from the chroma component of a color video signal, comprising:

(a) gating means;

(b) comb filter means including means for actuating said gating means upon occurrence of a disparity between the image lines being operated upon by said comb filter means to produce its filtering action; and (c) band-pass filtering means arranged to separate luminance-frequency signal components from color subcarrier-frequency signal components;

(d) said gating means being connected to pass the output of said comb filter means through said band-pass filtering means only when said gating means are actuated.

15. A method of improving the quality of a video picture, comprising the steps of:

(a) electronically comparing corresponding portions of at least two separate frames of the video picture having the same phase, the first of said frames being the $n^{th}$ frame of said video picture;

(b) using the result of said comparison to combine said corresponding portions;

(c) transmitting said combination of said portions; and (d) repeating said comparison, combination, and transmission with said first frame being, successively, the $(n+1)^{th}$, $(n+2)^{th}$, etc. frame of said video picture.

16. The method of claim 15, further comprising the steps of combining said corresponding portions only when said comparison indicates the absence of motion between said corresponding portions, and transmitting, for those portions where motion is present, only said one of said frames of said video picture.

17. A method of improving the quality of a video picture, comprising the steps of:

(a) electronically comparing a first signal including at least a predetermined proportion of a signal representing a portion of the $n^{th}$ frame of said video picture with a second signal representative of at least predetermined proportions of the corresponding portions of k other frames of said video picture, where $k$ is a positive integer;

(b) electronically modifying said first signal in stationary portions of said video picture by combining it with said second signal, in predetermined proportions, when and only when said comparison indicates the absence of motion in said picture portion;

(c) transmitting said first signal; and (d) repeating said comparison, modification, and transmission successively for the $(n+1)^{th}$, $(n+2)^{th}$, etc. frame of said video picture.

* * * * *